US012278453B2

(12) United States Patent
Rink et al.

(10) Patent No.: US 12,278,453 B2
(45) Date of Patent: Apr. 15, 2025

(54) ELECTRIC GROUND ASSEMBLY FOR GROUNDING A VEHICLE COMPONENT

(71) Applicant: Ford Global Technologies, LLC, Dearborn, MI (US)

(72) Inventors: Alexander Robert Rink, Royal Oak, MI (US); Nathaniel Conti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 17/946,396

(22) Filed: Sep. 16, 2022

(65) Prior Publication Data

US 2024/0097358 A1 Mar. 21, 2024

(51) Int. Cl.
*H01R 4/66* (2006.01)
*H01R 4/64* (2006.01)

(52) U.S. Cl.
CPC ................. *H01R 4/66* (2013.01); *H01R 4/64* (2013.01)

(58) Field of Classification Search
None
See application file for complete search history.

(56) References Cited

U.S. PATENT DOCUMENTS 3,755,726 A * 8/1973 Knipe .................... B23Q 15/00 318/563
6,368,038 B1 4/2002 Uno
8,070,404 B1 * 12/2011 Schluter ................ F16B 41/002 411/368
9,768,531 B1 9/2017 Schlaupitz et al.
10,784,600 B1 * 9/2020 Smith .................... H01R 11/26
2004/0011550 A1 * 1/2004 Imai ..................... H05K 9/0018 174/74 R
2014/0068930 A1 * 3/2014 Strizki .................... H01R 4/34 411/542
2014/0140786 A1 * 5/2014 McKinlay ............ F16B 41/002 411/147

FOREIGN PATENT DOCUMENTS

JP 4608155 1/2011
JP 6101592 3/2017

* cited by examiner

*Primary Examiner* — Hoa C Nguyen
*Assistant Examiner* — John B Freal
(74) *Attorney, Agent, or Firm* — Burris Law, PLLC

(57) ABSTRACT

An electrical ground assembly for a vehicle component includes a bushing including an upper serrated surface and a lower serrated surface opposite the upper serrated surface, a ground strap including a terminal, and a fastener including a head portion, a shaft extending from the head portion, and a flange extending radially between the head portion and the shaft portion. The terminal is electrically connected to the bushing between the upper serrated surface and the lower serrated surface. The flange includes a lower serrated surface configured to mate with the upper serrated surface of the bushing.

20 Claims, 5 Drawing Sheets

ELECTRIC GROUND ASSEMBLY FOR GROUNDING A VEHICLE COMPONENT

FIELD

The present disclosure relates to electrically grounding a vehicle component.

BACKGROUND

The statements in this section merely provide background information related to the present disclosure and may not constitute prior art.

Electrical components in vehicles are grounded to inhibit the undesirable transmission of electricity to other components or the surrounding environment. An electrical connection is formed between the component and a ground to electrically ground the component. The components often include electrically insulating coatings to inhibit transmission of electricity from the surface of the component and to inhibit corrosion of the component. Typically, a boss or exposed surface provides the electrical contact for the grounding; however, such a feature can be more susceptible to corrosion.

The present disclosure addresses the challenges related to grounding an electrical component of the vehicle while providing sufficient corrosion protection.

SUMMARY

This section provides a general summary of the disclosure and is not a comprehensive disclosure of its full scope or all of its features.

In one form, an electrical ground assembly for a vehicle component includes a bushing including an upper serrated surface and a lower serrated surface opposite the upper serrated surface, a ground strap comprising a terminal, the terminal electrically connected to the bushing between the upper serrated surface and the lower serrated surface, and a fastener including a head portion, a shaft extending from the head portion, and a flange extending radially between the head portion and the shaft portion, the flange comprising a lower serrated surface configured to mate with the upper serrated surface of the bushing.

In variations of the electrical ground assembly, which may be implemented individually or in combination: the bushing defines a central opening, and the fastener extends through the central opening; further including a nut secured to a shaft of the fastener, the nut securing the fastener to the vehicle component and forming an electrical connection between the vehicle component and the ground strap; a size of serrations of the upper serrated surface of the bushing is a same size as serrations of the lower serrated surface of the flange; the lower serrated surface of the flange is arranged to rotate the bushing by contact between the mated lower serrated surface of the fastener and the upper serrated surface of the bushing; the serrations of the upper serrated surface of the bushing extend at an angle relative to a central axis of the bushing such that the bushing is configured to rotate in one direction by contact with the fastener and further configured not to rotate in an opposite direction; the ground strap is spaced above the vehicle component; the bushing includes a lower portion including the lower serrated surface and an upper portion including the upper serrated surface, the lower portion including a flange securing the lower portion to the upper portion.

In another form, a vehicle component includes an electrically conductive component surface, a non-conductive coating disposed on the component surface, an electrically conductive bushing including a serrated surface and a radial surface extending from the serrated surface, and a ground strap electrically connected to the radial surface of the bushing. The serrated surface electrically connects the component surface to the ground strap.

In variations of the vehicle component, which may be implemented individually or in combination: the serrated surface is arranged to remove at least a portion of the non-conductive coating between the bushing and the component surface; the component surface defines a cavity and the bushing is fixed in the cavity; further including a fastener fixing the bushing to the component surface; the bushing includes a second serrated surface and the fastener includes a serrated surface configured to mate with the second serrated surface of the bushing; the bushing is rotatable by the fastener to remove at least a portion of the non-conductive coating between the bushing and the component surface; the component surface is a battery cover; the non-conductive coating is an E-coat material.

In another form, a method of electrically grounding a vehicle component includes placing a first serrated surface of an electrically conductive bushing onto a non-conductive coating of the vehicle component, placing a fastener onto a second serrated surface of the bushing, rotating the bushing with the fastener to press the first serrated surface against a non-conductive coating on the surface of the vehicle component, and removing at least a portion of the non-conductive coating from an electrically conductive surface of the vehicle component with the first serrated surface to form an electrical connection between the bushing and the vehicle component.

In variations of the method, which may be implemented individually or in combination: further including fixing a ground strap to the bushing to ground the vehicle component; the fastener has a serrated surface configured to mate with the second serrated surface of the bushing, the method further including rotating the bushing via the mated serrated surface of the fastener and the second serrated surface of the bushing; the bushing is configured to rotate in one direction and further configured not to rotate in an opposite direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
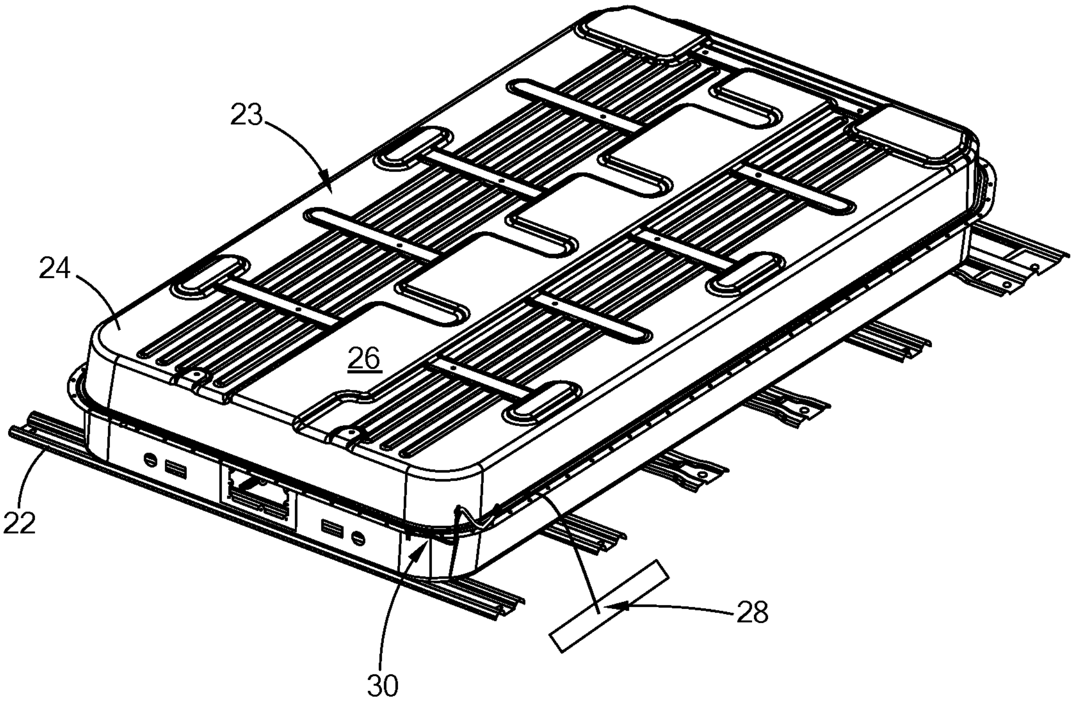
FIG. 1 is a perspective view of a vehicle component secured to a structural component according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle component 20 is shown installed at and secured to a structural member 22 of a vehicle. In one form, the vehicle component 20 is a battery assembly that includes a housing (generally referred to with reference number 23) and a battery (not shown) provided in the housing 23. Typically, the battery assembly provides power to an electric propulsion system for the vehicle, such as but not limited to: a battery electric vehicle (BEV), a hybrid electric vehicle (HEV), a plug-in electric vehicle (PHEV), or a fuel cell vehicle. In an example application, as the vehicle component, the battery assembly is secured to a chassis, a frame, or a subframe of the vehicle via the structural member 22.

In one form, the housing 23 has an electrically conductive component surface 24 that is covered with a non-conductive coating 26 to inhibit electric power from being transmitted from the battery through the component surface 24, which is conductive, to other components in contact with the component surface 24. The non-conductive coating 26 may be a paint or other electrically insulative coating, such, but not limited to, an electrodeposited coating material that is applied to the component surface 24, referred to as an "E-coat" material.

To ground the vehicle component 20, the present disclosure provides an electrical ground assembly that is configured to remove at least a portion of the non-conductive coating 26 from the vehicle component such that the component surface 24 electrically couples to a ground member. More particularly, a grounding location 28 is a location at which an electrical ground assembly 30, discussed in greater detail below, grounds the vehicle component 20, and may be provided as, but not limited to, a chassis or other frame component.

Figure 2:
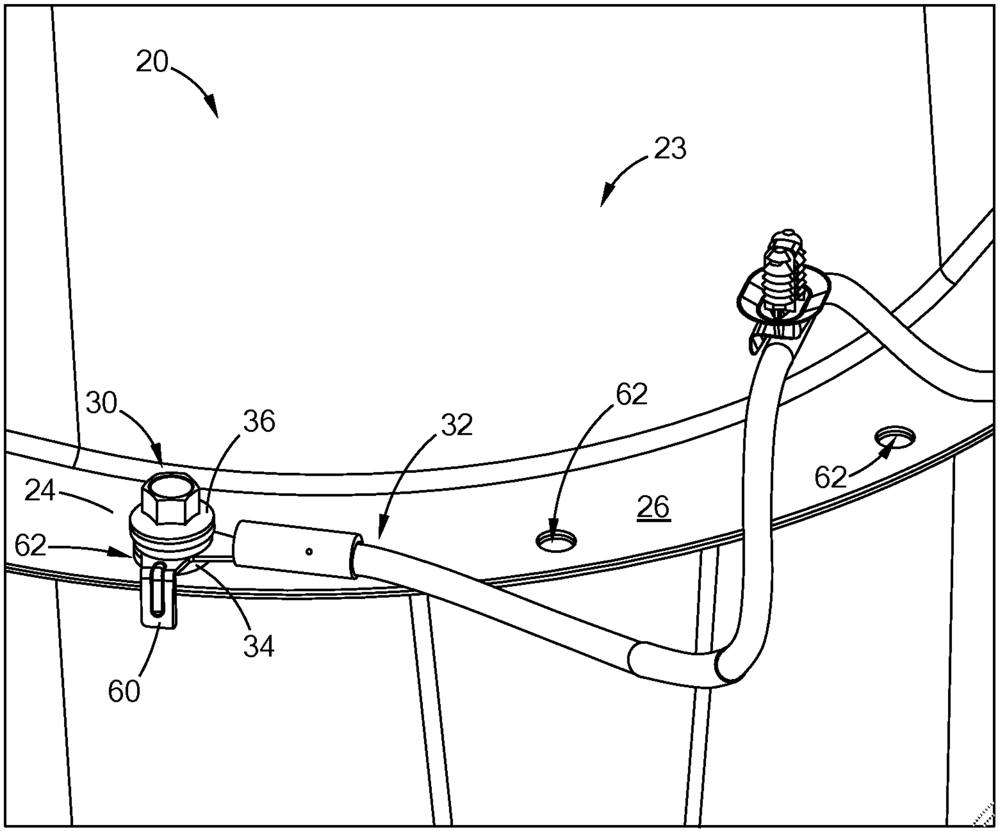
FIG. 2 is a perspective view of an electrical ground assembly for the vehicle component according to the present disclosure.
Figure 3:
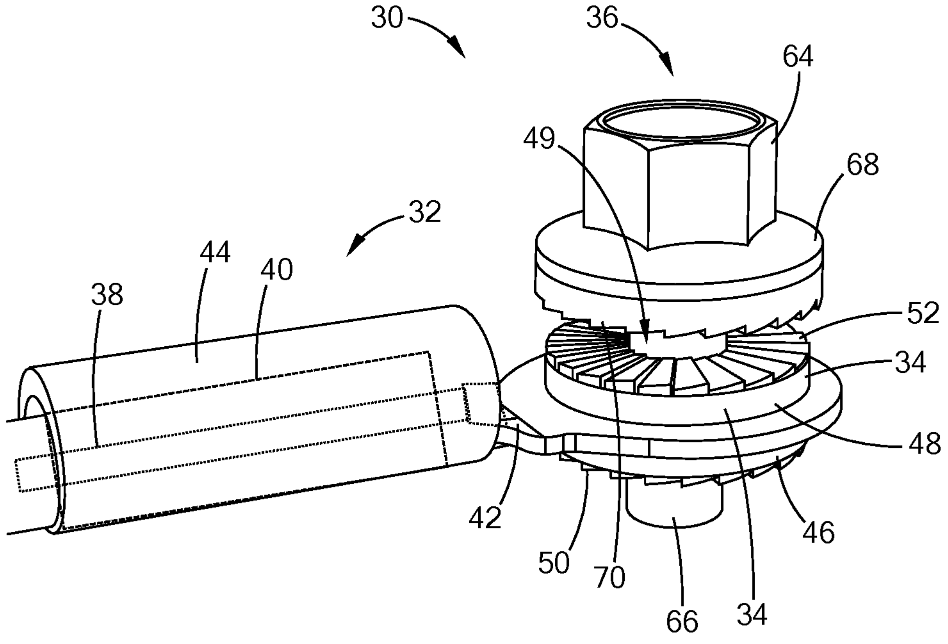
FIG. 3 is an enlarged perspective view of the electrical ground assembly of FIG. 2 according to the present disclosure.
Figure 4:
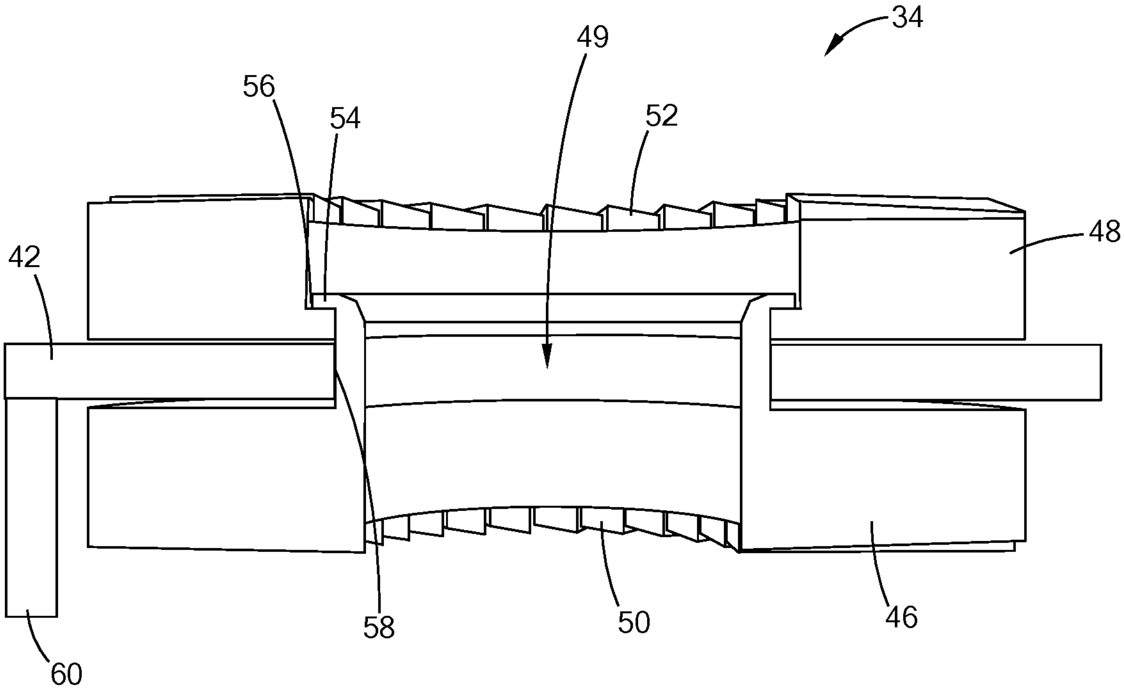
FIG. 4 is a side cross-sectional view of a bushing and a terminal of the electrical ground assembly of FIG. 2 according to the present disclosure.

With reference to FIGS. 2-4, in one form, the electrical ground assembly 30 is secured to the vehicle component 20 and is configured to ground the vehicle component 20 to the chassis. In one form, the electrical ground assembly 30 includes a ground strap 32, a bushing 34, and a fastener 36. As described herein, the ground strap 32, the bushing 34, and the fastener 36 form an electrical path between the vehicle component 20 and the grounding location 28.

In one form, the ground strap 32 includes an electrically conductive wire 38, shown covered in an electrically insulating sheath 40, a terminal 42, and a crimped insulator 44 covering the connection between the wire 38 and the terminal 42. The terminal 42 electrically connects the bushing 34 to the wire 38, and the wire 38 electrically connects the terminal 42 to the chassis. The insulating sheath 40 and the crimped insulator 44 inhibit transmission of electrical current from the wire 38 and the terminal 42 between components other than the bushing 34 and the chassis. In this form, the ground strap 32 includes an anti-rotation feature 60 that secures the terminal 42 to the housing 23. The anti-rotation feature 60 inhibits rotation of the terminal 42 and the wire 38 connected thereto, preventing winding or tangling of the wire 38.

In this form, the ground strap 32 is spaced above the component surface 24 such that a gap is vertically defined between the terminal 42 and the housing 23. Spacing the terminal 42 vertically away from the housing 23 inhibits interference of the terminal 42 from the component surface 24 and the non-conductive coating 26. In this form, the terminal 42 of the ground strap 32 grounds electricity to the chassis through the bushing 34 and not from the component surface 24 directly. In another form not shown, the ground strap 32 is arranged such that the terminal 42 contacts the housing 23 to inhibit movement of the terminal 42.

In one form, the bushing 34 is a two-piece construction that includes a lower portion 46 and an upper portion 48, as shown in FIG. 4. The lower portion 46 and the upper portion 48 define a central opening 49 of the bushing 34. The lower portion 46 includes a lower serrated surface 50, and the upper portion 48 includes an upper serrated surface 52. The upper and lower serrated surfaces 50, 52 include serrations that extend at an angle relative to a central axis of the bushing 34. As described in further detail below, the serrations remove the non-conductive coating 26 of the housing 23. The lower portion 46 includes a securing flange 54 that forms a friction fit with a ledge 56 of the upper portion 48 to secure the upper and lower portions 46, 48 together.

The lower portion 46 defines a radial surface 58 around the central opening 49. The terminal 42 of the grounding strap 32 is disposed between the upper and lower portions 46, 48 and against the radial surface 58. The terminal 42 contacts the bushing 34 at one or both of the upper and lower portions 46, 48, electrically grounding the bushing 34 to the chassis. The bushing 34 is rotatable relative to the terminal 42, such that the bushing 34 can rotate (e.g., by the fastener 36 as described below), and the terminal 42 does not move with the bushing 34.

The fastener 36 is configured to secure the bushing 34 to the component surface 24. In this form, the fastener 36 is a bolt configured to connect to a nut (not shown). The fastener 36 extends through a cavity 64 defined in the housing 23. The fastener 36 secures the ground strap 32 and the bushing 34 to the component surface 24. In another form, the component surface 24 includes a threaded slot or a tapped boss into which the fastener 36 secures the bushing 34.

The fastener 36 includes a head portion 64, a shaft 66 extending from the head portion 64, and a flange 68 extending radially between the head portion 64 and the shaft 66. The shaft 66 extends through the central opening 49 of the bushing 34 to the component surface 24. The flange 68 includes a lower serrated surface 70 configured to mate with the upper serrated surface 52 of the bushing 34. In one form, when the head portion 64 of the fastener 36 is rotated, the serrations of the fastener 36 contact and rotate the serrations of the bushing 34, causing the bushing 34 to rotate. Rotation of the bushing 34 causes the serrations of the lower serrated surface 50 in contact with the component surface 24 to move along the component surface 24. The serrations of the bushing 34 are configured to rotate in one direction by contact with the fastener 36 and not to rotate in an opposite direction.

Figure 5:
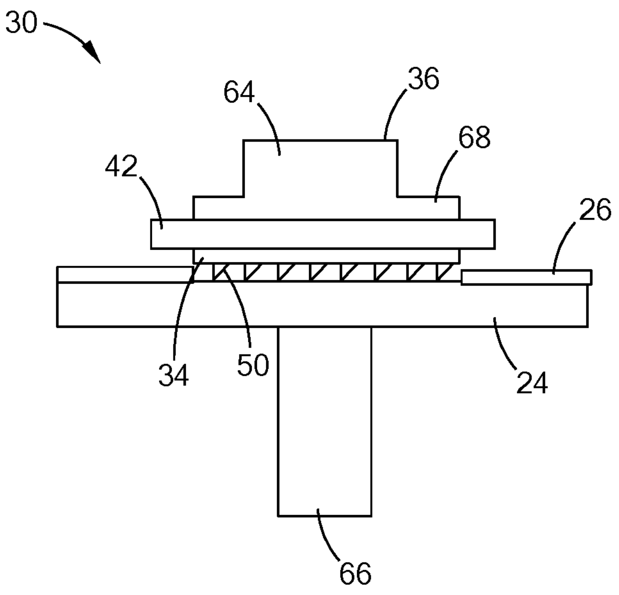
FIG. 5 is a side cross-sectional view of the electrical ground assembly according to the present disclosure.

With reference to FIG. 5, the lower serrated surface 50 strips the non-conductive coating 26 to form the electrical connection with the component surface 24. The serrations are designed to remove at least a portion of the non-conductive coating 26 between the bushing 34 and the component surface 24 when rotated along the component surface 24. The non-conductive coating 26 around the bushing 34 remains intact, protecting the component surface 24 from corrosion. The serrations of the lower serrated surface 50 remove the non-conductive coating 26 beneath the bushing 34 when the head portion 64 rotates the flange 68 and the bushing 34, and the serrations directly contact the electrically conductive component surface 24. By removing the non-conductive coating 26 of the housing 23 on the component surface 24, the bushing 34 and the component surface 24 form an electrical connection, and thus, grounding the component surface 24 to the grounding location 28 (e.g., of the chassis) via the ground strap 32 and the bushing 34.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electrical ground assembly for a vehicle component, the electrical ground assembly comprising:

a bushing including an upper serrated surface and a lower serrated surface opposite the upper serrated surface;

a ground strap comprising a terminal, the terminal electrically connected to the bushing between the upper serrated surface and the lower serrated surface; and a fastener including a head portion, a shaft extending from the head portion, and a flange extending radially between the head portion and the shaft portion, the flange comprising a lower serrated surface configured to mate with the upper serrated surface of the bushing, wherein the bushing includes a lower portion including the lowered serrated surface and an upper portion including the upper serrated surface, the lower portion and the upper portion are secured to each other.

2. The electrical ground assembly of claim 1, wherein the bushing defines a central opening, and the fastener extends through the central opening.

3. The electrical ground assembly of claim 2, further comprising a nut secured to a shaft of the fastener, the nut securing the fastener to the vehicle component and forming an electrical connection between the vehicle component and the ground strap.

4. The electrical ground assembly of claim 1, wherein a size of serrations of the upper serrated surface of the bushing is a same size as serrations of the lower serrated surface of the flange.

5. The electrical ground assembly of claim 1, wherein the lower serrated surface of the flange is arranged to rotate the bushing by contact between the mated lower serrated surface of the fastener and the upper serrated surface of the bushing.

6. The electrical ground assembly of claim 5, wherein the serrations of the upper serrated surface of the bushing extend at an angle relative to a central axis of the bushing such that the bushing is configured to rotate in one direction by contact with the fastener and further configured not to rotate in an opposite direction.

7. The electrical ground assembly of claim 1, wherein the ground strap is spaced above the vehicle component.

8. The electrical ground assembly of claim 1, wherein the bushing includes a lower portion including the lower serrated surface and an upper portion including the upper serrated surface, the lower portion including a flange securing the lower portion to the upper portion.

9. A vehicle component, comprising:

an electrically conductive component surface;

a non-conductive coating disposed on the component surface;

an electrically conductive bushing including a serrated surface and a radial circumferential surface extending from the serrated surface; and a ground strap electrically connected to the radial circumferential surface of the bushing;

wherein the serrated surface electrically connects the component surface to the ground strap.

10. The vehicle component of claim 9, wherein the serrated surface is arranged to remove at least a portion of the non-conductive coating between the bushing and the component surface.

11. The vehicle component of claim 9, wherein the component surface defines a cavity and the bushing is fixed in the cavity.

12. The vehicle component of claim 9, further comprising a fastener fixing the bushing to the component surface.

13. The vehicle component of claim 12, wherein the bushing includes a second serrated surface and the fastener includes a serrated surface configured to mate with the second serrated surface of the bushing.

14. The vehicle component of claim 13, wherein the bushing is rotatable by the fastener to remove at least a portion of the non-conductive coating between the bushing and the component surface.

15. The vehicle component of claim 9, wherein the component surface is a battery cover.

16. The vehicle component of claim 9, wherein the non-conductive coating is an E-coat material.

17. A method of electrically grounding a vehicle component, the method comprising:

placing a first serrated surface of an electrically conductive bushing onto a non-conductive coating of the vehicle component;

placing a fastener onto a second serrated surface of the bushing;

rotating the bushing with the fastener to press the first serrated surface against a non-conductive coating on the surface of the vehicle component; and removing at least a portion of the non-conductive coating from an electrically conductive surface of the vehicle component with the first serrated surface to form an electrical connection between the bushing and the vehicle component.

18. The method of claim 17, further comprising fixing a ground strap to the bushing to ground the vehicle component.

19. The method of claim 17, wherein the fastener has a serrated surface configured to mate with the second serrated surface of the bushing, the method further comprising rotating the bushing via the mated serrated surface of the fastener and the second serrated surface of the bushing.

20. The method of claim 17, wherein the bushing is configured to rotate in one direction and further configured not to rotate in an opposite direction.

* * * * *